J. T. LISTER.
METHOD OF MAKING TIRE FORMING STRIPS.
APPLICATION FILED MAR. 7, 1913.
1,147,252.
Patented July 20, 1915.
3 SHEETS—SHEET 1.
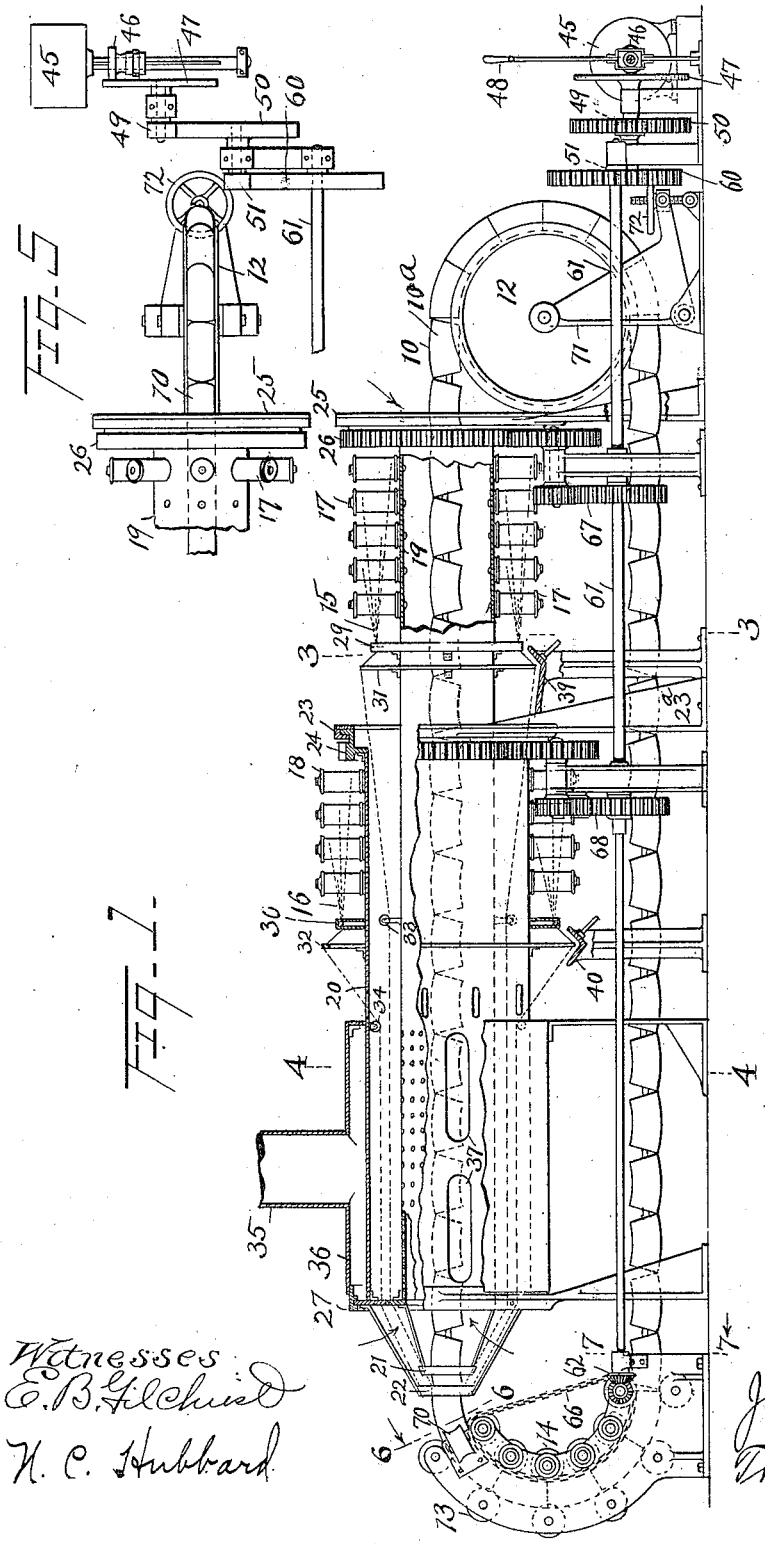

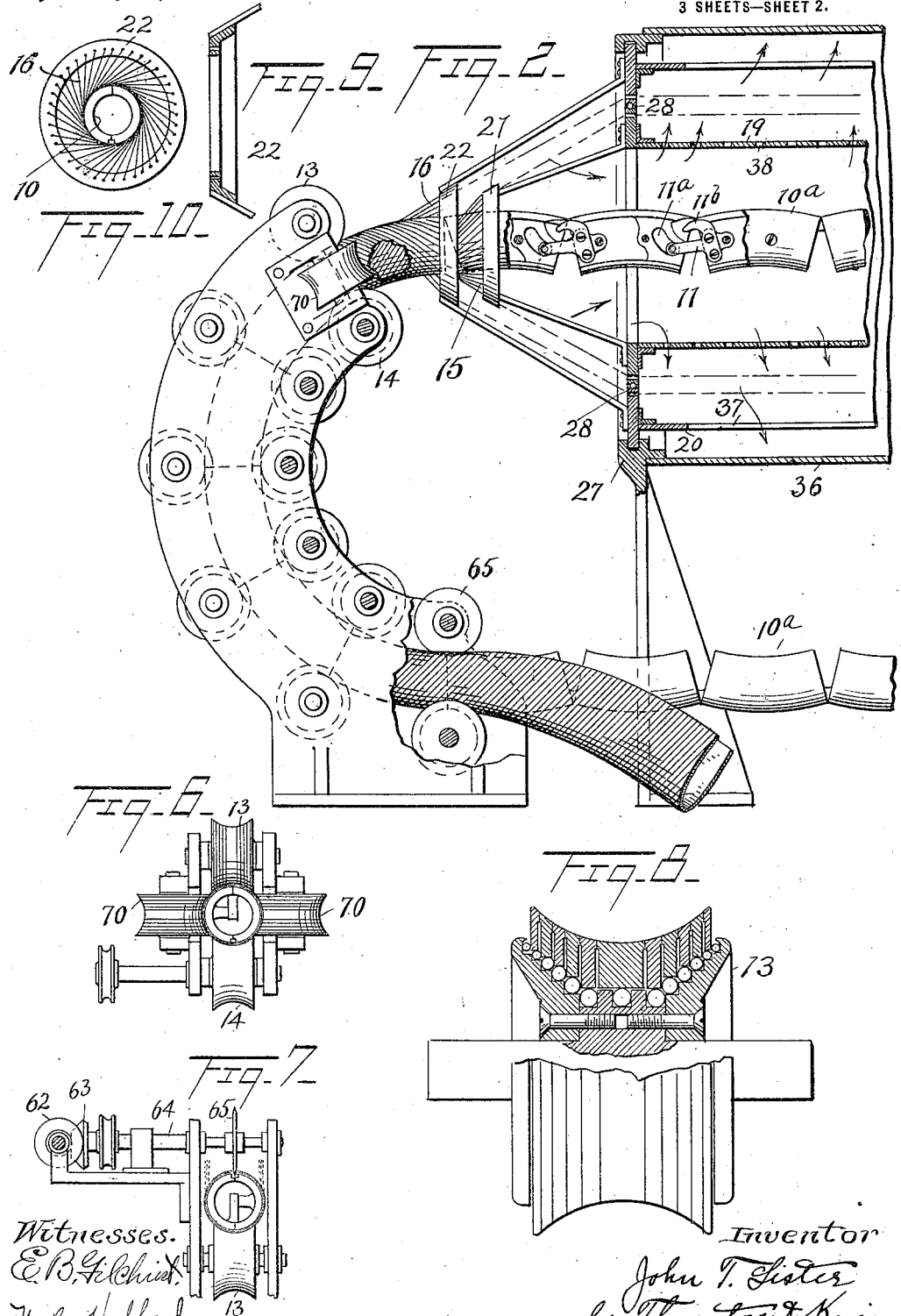

J. T. LISTER.
METHOD OF MAKING TIRE FORMING STRIPS.
APPLICATION FILED MAR. 7, 1913.
1,147,252.
Patented July 20, 1915.
3 SHEETS—SHEET 3.
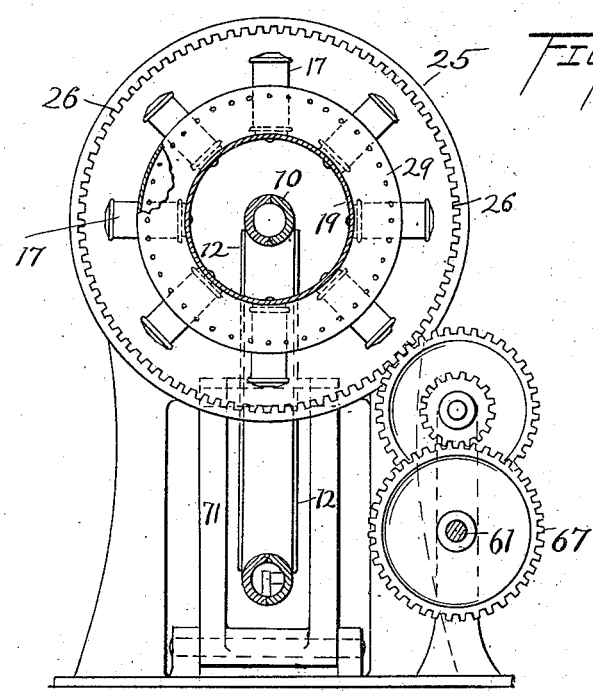
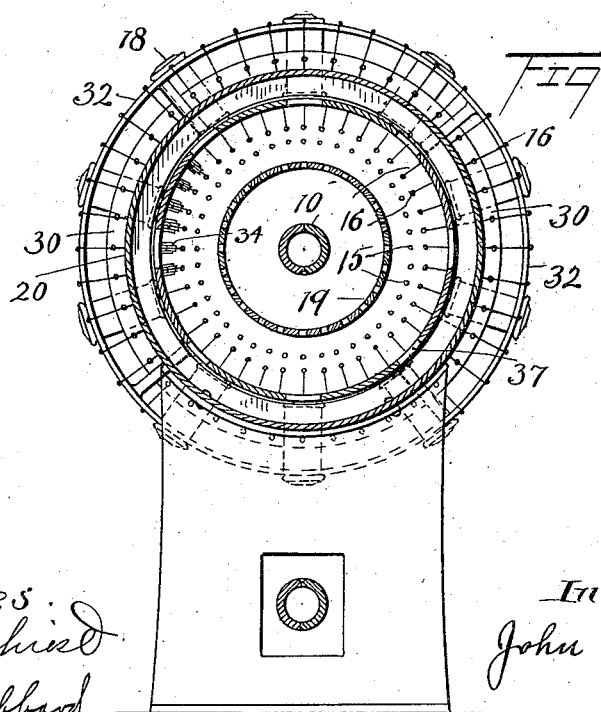

UNITED STATES PATENT OFFICE.

JOHN T. LISTER, OF CLEVELAND, OHIO.

METHOD OF MAKING TIRE-FORMING STRIPS.

1,147,252.        Specification of Letters Patent.        Patented July 20, 1915.

Application filed March 7, 1913. Serial No. 752,580.

*To all whom it may concern:*

Be it known that I, JOHN T. LISTER, a citizen of the United States, residing at Cleveland, in the county of Cuyahoga and State of Ohio, have invented a certain new and useful Improvement in Methods of Making Tire-Forming Strips, of which the following is a full, clear, and exact description.

This invention relates to method for forming rubberized fabric tubes or strips from strip forming material such as rubberized thread or cords, and is of particular utility in forming hose and tire forming strips.

My invention in one of its aspects consists in winding about a movable core in different directions a plurality of groups of rubberized threads or cords, the groups of threads being wound in such a manner as to form superimposed layers, each of closely associated spirally arranged threads or cords, and the threads or cords of each layer being arranged at a decided angle with respect to the threads or cords of the adjacent layer.

In utilizing my invention for forming tire strips for which the invention has particular utility, the movable core at and adjacent the points where the groups of threads are wound thereon in opposite directions is substantially of the shape and size of a tire forming core upon which the strips may subsequently be wound, and in carrying out my process of forming these tire forming strips, the strips after being initially formed into annular shape are cut or divided on the inner side so that the said strips can be readily applied to a tire forming core, and formed into commercial tires or tire casings.

In the drawings, I have shown one form of apparatus which may be utilized in carrying out my invention in one of its aspects, or for one of the specific uses to which my invention may be applied, i. e., for the formation of tire forming strips, or strips which may be utilized in the construction of ordinary automobile tires.

In the figures of the drawing, Figure 1 is a side elevation of one form of apparatus which may be utilized for the purpose stated, parts being in section, and other parts being broken away; Fig. 2 is an enlarged sectional side elevation of the forward portion of the apparatus or of that portion at which the tire strips are formed; the cords on the right of winders being omitted for the sake of clearness. Fig. 3 is a sectional view substantially along the line 3—3 of Fig. 1, the parts being shown on a slightly enlarged scale. Fig. 4 is an enlarged sectional view substantially along the line 4—4 of Fig. 1. Fig. 5 is a plan view of the rear part of the apparatus, showing particularly the motor and gearing utilized in driving the parts of the apparatus. Fig. 6 is a sectional view substantially along the line 6—6 of Fig. 1, looking in the direction indicated by the arrow. Fig. 7 is a sectional view substantially along the line 7—7 looking in the direction indicated by the arrow. Fig. 8 is a detail sectional view of one of the compression rollers. Figs. 9 and 10 are sectional and side views, respectively, on an enlarged scale of one of the cord winders which guide and wind the cords onto the moving core.

Referring now to the drawings, it will be seen that the apparatus includes a core 10 which in this case consists of a series of core sections 10ª linked together in the form of an endless chain. Each of these core sections is circular in cross section, and lengthwise considered is arc shaped or in the shape of a section of an annular member or core of a tire forming machine upon which the strips formed with my apparatus are adapted to be subsequently wound in the actual manufacture or construction of the commercial tires, or of the outer casings of the tires of the inner tube type.

Each core section 10ª is preferably composed of two half sections fastened together, (see Figs. 3 and 4) and the different sections are linked together in the manner shown in Fig. 2, wherein it will be seen that each section has secured on the interior thereof, and at one end, a member 11 with a projecting arm carrying a roller which engages in a slot 11ª in a webbing at the end of the next adjacent core section. The member 11 also has a projecting portion 11ᵇ, which extends outwardly toward the outer parts of the two adjacent sections of the core, so as to assist in holding the sections in alinement, when the sections pass about the supporting structure at the forward part of the apparatus, where the strips are formed.

At the rear end of the apparatus, the chain of core sections 10ª passes about a wheel or pulley 12, and at the forward part of the apparatus, the chain of core sections passes between an outer series of rollers 13, and an inner series of rollers 14,—the axes of the two series of rollers being arranged in arcs of concentric circles having diameters such that as the core sections pass between the rollers 13 and 14, they are in the form of a substantially half circle corresponding in size to that of half of a tire forming core upon which the strips may be formed into tires. As the core sections pass between the rollers 13, and 14, the ends of the core sections abut against each other, so as to form a substantially solid semi-annular core, and when they are so arranged, the projecting members 11ᵇ within the core sections come into play to assist in holding the core sections against relative lateral movement.

In the drawings I have shown an apparatus for forming the tire strips of two layers or from two oppositely wound groups of cords which extend down onto the core from two annular winders to be referred to, in coaxial conical envelops which surround the core at the strip forming end of the apparatus and are arranged one in advance of the other so as to result in the two layers. The two groups of threads may be designated 15 and 16, the former forming the inner layer and the latter the outer layer. The arrangement is perhaps most clearly disclosed in Fig. 2.

For an understanding of the manner in which I propose to feed the groups of cords to the rotating winders, and the manner in which the cords are rubberized, and thence dried before passing to the winders reference is had particularly to Fig. 1. By referring to this figure, it will be seen that the groups of threads are fed to the winders from two series of spools 17 and 18, which are mounted on pins or studs projecting radially outward from two hollow concentric rotary cylinders 19 and 20, the inner one of which projects rearwardly beyond the outer cylinder and the inner cylinder constituting the support for the spools which supply the cords 15 which form the inner layer, and the outer cylinder constituting the support for the spools which supply the cords 16 for the outer layer. These two cylinders, together with the spools are designed to be simultaneously rotated in opposite directions. At the forward end of the apparatus are the two rotary annular winders 21 and 22, which are supported from the two cylinders so as to rotate therewith, and hence will rotate in opposite directions. It may be noted at this point that the upper leg of the chain 10 of core sections 10ª passes through the two cylinders and through the winders 21 and 22, which are located at the point where the core sections arrange themselves in the form of a half circle, as previously described. It will be observed that the rear end of the outer cylinder 20 is rotatably supported by an annular support 23 which is supported from beneath by a bracket 23ª and contains an annular groove which relieves a radially projecting flange extending outwardly from a driving gear 24 which is secured to the cylinder 20. In a like manner, the inner cylinder is supported by an annular supporting member or housing 25 which will receive the flange projecting from the driving gear 26, a detail of the construction not being shown, as the construction is the same as that at the rear end of cylinder 20.

By reference to Fig. 2, it will be seen that the forward end of the outer cylinder is supported by an annular supporting member or housing 27, having a groove which receives a radially projecting portion of a flange secured to the outer cylinder. The forward end of the inner cylinder is supported from the outer cylinder through the medium of ball bearings 28.

The cords are rubberized or coated with rubber cement after they leave the spools by being passed through rubber cement containing chambers 29 and 30, the former of which is secured to the inner drum 19 just forward of the spools 17 and the latter of which is secured to the drum 20 just forward of the spools 18. The threads after passing through openings in the walls of the cement chambers 29 and 30, pass through notches or openings at the periphery of annular guides 31 and 32, one just forward of the cement chamber 29 and the other just forward of the cement chamber 30, and thence the cords extend forwardly in the annular space between the inner and outer cylinders, over suitable guide rollers 33 and 34, the threads extending in the form of two substantially cylindrical envelops. At the forward end of the cylinders, the cords pass outwardly from the annular space referred to, the inner group of cords passing through openings in a radial flange secured to the end of the inner cylinder, and the outer group of threads passing through openings in a radial flange at the end of the outer cylinder. Thence the cords pass diagonally downward and inward through openings in the rotary annular winders 21 and 22 and thence are wound in opposite directions spirally onto the core.

In passing forwardly from the guide rollers 33 and 34 to the forward ends of the cylinders, the rubberized threads are dried,—the annular space between the cylinders constituting a drying chamber. The rubberized cords are dried by a forced circulation of air drawn through the annular space between the two drums, by means of a suction pipe 35 connected to a drum 36 which is supported in fixed position about the two cylinders, between the rotary winders 21 and 22 at the forward ends of the cylinders, and the cement baths or chambers through which the cords pass.

The air which is drawn through the pipe 35 from the drum 36 is drawn through the annular space between the two concentric cylinders. The inner cylinder has suitable perforations 38 which admit the air to the annular space between the cylinders, and the outer cylinder has openings 37 through which the air is drawn from said annular space into the surrounding drum, and thence out through the pipe 35.

Beneath the guides 31 and 32, just in advance of the rubber bath are two drip troughs 39 and 40, which catch the excess rubber cement which is retained on the guides 31 and 32, as the cords pass over the same. These drip troughs may have suitable outlet openings or outlet pipes, as shown.

I shall now describe the manner in which the core sections and the other parts of the apparatus are driven to produce the tire strips. A driving motor 45 has secured to its shaft a friction disk 46 which by frictional engagement drives a friction wheel 47. To vary the speed of the apparatus, the wheel 46 is shifted along the face of the driven wheel 47 by a suitable lever 48. The shaft on which the driven friction wheel 47 is secured, is provided with a pinion 49 which engages a gear 50, and the shaft upon which the gear 50 is secured is provided with a pinion 51 which engages a gear 60 secured to a long forwardly projecting shaft 61 from which all parts of the apparatus are driven. This shaft 61 is provided at its forward end with a bevel gear 62, which meshes with a bevel gear 63, which as will be observed from Figs. 1, 2 and 7, is secured to a transversely arranged shaft 64 provided with a rotating cutter 65, (see particularly Figs. 2 and 7), which cutter cuts the tube formed by the two layers of cords along the line of its inner periphery, into an open strip suitable for winding upon a tire forming core, this cutter being arranged at the bottom of the half circular substantially rigid arrangement of core sections, and at the point where the core sections change from the semi-circular formation into the linear formation, as they travel rearwardly along the lower leg of the endless chain.

The endless chain 10 of core sections can be driven in any suitable manner. I prefer, however, to utilize the inner series of rollers 14 for driving purposes. Consequently, I utilize the rollers 14 not only for cord compressing purposes, as will be referred to presently, but positively drive them so as to cause the said rollers to drive the chain of core sections. These rollers 14 are driven through the medium of a sprocket chain 66 which engages suitable sprocket wheels on the shaft 64 to which the cutter 65 is secured, and on the shafts or spindles to which the several rollers 14 are secured.

The inner drum is driven through gearing designated as a whole by the reference character 67 which gearing includes a gear on the long shaft 61 and the gear 26 secured to the rear end of the drum. In a similar manner, the outer drum is rotated by gearing designated as a whole by the reference character 68, this gearing including a gear on the shaft 61, and the gear 24 at the rear end of the outer drum. In order that the two drums may be driven in opposite directions simultaneously, the set of gears 68 includes in its train an idler gear (the details of which need not be here shown) which causes the gear 24 to be driven in the reverse direction with respect to the direction in which the gear 26 is driven. Thus it will be seen that with the above described mechanism, the chain of core sections is driven through the drums and through the winders; the core sections arrange themselves in the form of a half circle having considerable rigidity just beyond the winders; the cylinders carrying the spools which are rotated at the same angular speed but in reverse direction, as are likewise the winders which are connected to the cylinders; the cords are fed from the spools, pass through the rubber cement baths,—are dried, and thence passed downwardly through openings in the annular winders which cause the cords to be wound in the two superimposed layers, the cords of one layer making a decided angle with the cords of the other layer. The cords of each layer adhere strongly to one another, and the two layers are also strongly adhesive. It will be understood that the length of tubular fabric formed in this manner at each revolution of the winders will depend upon the number of cords in each group, the rate of movement of the core being therefore dependent upon the number of threads in each group. I prefer to utilize at least forty cords in each group, although this number could be increased or decreased as found desirable.

After the cords are laid onto the core in the manner above described in the two superimposed strongly adhering layers, the cords of the latter are compressed by the rollers 13 and 14, the rollers 14 driving the core sections, and also compressing the cords, and the rollers 13 being driven by the traveling core sections and serving only to compress the cords. I prefer to use also in addition to the inner and outer sets of rollers 13 and 14, side rollers 70 in order that, as will be apparent from Fig. 6, all portions of the cords on the core will be compressed.

Preferably, as shown in Fig. 8, each of the rollers 13 and 70 is composed of a plurality of separately mounted sections which results in a much better compressing action at all points than would be the case if the roller were composed of a single rotating section, for with the construction shown all parts of the roller have a true rolling action on the fabric surrounding the core, whereas otherwise there would be a certain degree of slippage between the fabric and certain portions of the roller, inasmuch as the rollers are concave, and the side portions are of greater diameter than the middle portions.

As the tube thus formed on the core of the two superimposed layers passes from between the rollers, the tube is cut by the cutter 65, leaving the tube open at its inner periphery as shown in Fig. 2. This open tube can then be wound upon a suitable reel until it is desired to apply the same to the core of a tire making machine.

It will be observed that I have made suitable provision for adjusting the tension of the chain of core sections by mounting the wheel 12 in a pivotally supported bracket 71, which can be rocked on its pivot by a suitable adjusting mechanism 72, the actuation of the latter serving to move the axis of the wheel 12 toward or away from the forward end of the apparatus.

One of the great advantages of a tire strip formed with my improved method lies in the fact that when it is applied to the core of a tire forming machine, it at once adjusts itself to the shape of the core, and when placed on the core there is no material stretching of the fabric, as is the case when the tire is formed of regular woven strips, and with the strips formed with my method the outer parts are not placed under initial tension or stress, as is the case when the ordinary strips are stretched in applying them about the periphery of the core of a tire making machine.

The apparatus herein disclosed is claimed in a copending application filed by me on the 7th day of May, 1914, Serial No. 836,911, entitled Apparatus for forming rubberized fabric tubes or strips.

The product of the apparatus and of the machine herein disclosed is claimed in a copending application filed by me on the 6th day of May, 1914, Serial No. 836,602, entitled Tire forming material.

Having thus described my invention, what I claim is:

1. The method of making a tire forming strip adapted to be applied to the core of a tire forming machine, which comprises winding tire forming material about a portion of a core having substantially the cross sectional and circumferential curvature of the tire forming core so as to form a longitudinally curved tube, slitting the tube, and conducting the strip thus formed from a part of the strip forming core distant from the winding point.

2. The method of making a tire forming strip adapted to be applied to the core of a tire forming machine, which comprises forming the strip from material in the form of strands on a part of a core curved in cross section and longitudinally, and conducting the strip from another part of the core.

3. The method of making a tire-forming strip adapted to be applied to the core of a tire-forming machine, which comprises winding tire-forming material on a portion of a core curved transversely and circumferentially so as to form a longitudinally curved tube, slitting the tube, and removing the strip thus formed from the core at a distance from the winding point.

4. The method of making a tire-forming strip which comprises winding tire-forming material about a portion of a traveling strip-forming core curved in cross section and longitudinally so as to form a longitudinally curved tube, slitting the tube on its inner periphery, and removing from the core at a predetermined distance from the winding point the strip thus formed.

5. The method of making a tire-forming strip which comprises continuously winding material spirally about a portion of a continuously traveling strip-forming core curved in cross section and longitudinally so as to form a longitudinally curved tube, slitting the tube on its inner periphery, and continuously removing from the core at a certain point the strip thus formed.

6. The method of making a tire-forming strip which comprises winding strip-forming material in opposite directions about a portion of a traveling core curved in cross section and longitudinally so as to form a longitudinally curved tube having a plurality of layers, and slitting the tube so that the strip thus formed may be continuously fed off the core at a certain point thereof.

7. The method of making a tire-forming strip which comprises winding strip-forming material about a portion of a traveling core curved in cross section and longitudinally so as to form a longitudinally curved tube, compressing the material on said curved portion of the core slitting the tube on its inner periphery, and removing the strip thus formed from the traveling core.

8. The method of making a tire-forming strip which comprises winding rubberized cords spirally in opposite directions about a portion of a traveling core curved in cross section and longitudinally so as to form a longitudinally curved tube having a plurality of layers, slitting the tube on its inner periphery, and removing from the traveling core the strip thus formed.

In testimony whereof, I hereunto affix my signature in the presence of two witnesses.

JOHN T. LISTER.

Witnesses:
N. C. HUBBARD,
A. F. KWIS.